(12) United States Patent
Hobson et al.

(10) Patent No.: US 7,453,812 B1
(45) Date of Patent: Nov. 18, 2008

(54) METHOD FOR DETECTING AND CORRECTING PUBLISH-SUBSCRIBE LOOPING IN A MESSAGING NETWORK

(75) Inventors: Stephen J Hobson, Hampton (GB); Gavin D. Beardall, Alresford (GB); Jose Emir Garza, Ruchmond (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,554

(22) Filed: Jan. 27, 2008

(51) Int. Cl.
*H04L 12/26* (2006.01)
*H04L 12/28* (2006.01)
*H04L 12/66* (2006.01)
*G06F 15/16* (2006.01)

(52) U.S. Cl. .................. 370/238; 370/253; 370/356; 370/389; 370/400; 709/232; 709/245

(58) Field of Classification Search .................. None
See application file for complete search history.

(56) References Cited

U.S. PATENT DOCUMENTS

| | | | |
|---|---|---|---|
| 5,321,812 A | 6/1994 | Benedict et al. | |
| 5,461,608 A | 10/1995 | Yoshiyama | |
| 5,946,680 A * | 8/1999 | Shorter et al. | 707/3 |
| 6,021,427 A * | 2/2000 | Spagna et al. | 709/206 |
| 6,230,198 B1 | 5/2001 | Dawson et al. | |
| 6,298,456 B1 | 10/2001 | O'Neil et al. | |
| 6,463,037 B1 * | 10/2002 | Ooyoshi et al. | 370/242 |
| 6,950,870 B2 | 9/2005 | Beaulieu | |
| 7,133,516 B2 * | 11/2006 | Belkin et al. | 379/211.02 |
| 7,292,585 B1 | 11/2007 | Slaughter et al. | |

* cited by examiner

*Primary Examiner*—Melanie Jagannathan
(74) *Attorney, Agent, or Firm*—MaxValueIP, LLC

(57) ABSTRACT

A method for detecting and correcting looping problems in a publish-subscribe messaging network is disclosed. The messaging network requires a token which uniquely identifies a node in this messaging network or universally unique in this messaging network. The messaging network maintains a list of Universally Unique Identifiers (UUID) as a metadata attached to each publish-subscribe message ("publication"). As a node forwards a publication to another node, it is required to append its own UUID to this list or discard the message if its UUID already is in the attached list. Several nodes could form a broker cooperative aggregate node and have a unique identifier for all the nodes in the cooperative if they have an internal mechanism for preventing publication looping.

1 Claim, 2 Drawing Sheets

METHOD FOR DETECTING AND CORRECTING PUBLISH-SUBSCRIBE LOOPING IN A MESSAGING NETWORK

BACKGROUND OF THE INVENTION

In complicated asynchronous messaging networks configurations or modification could cause unwanted and harmful message loops. For example, a message originating at node A could be routed to: node A→node B→node C→node A→ . . . forever This problem is particularly likely and severe with publish-subscribe messaging. Not only can a publication circulate forever, but each time around the loop it will copy itself to subscribing consumers. A number of factors make publish-subscribe loops complex to detect reliably: a) The links of a publish-subscribe network can be topic-specific, that is, a link might carry only messages with topics conforming to administratively-configured topic patterns; b) The links of a publish-subscribe network can be asymmetric; c) A publish-subscribe network can span multiple administrative domains and multiple different publish-subscribe implementations so that an administrator might not actually have the information they need for deciding if the new link will create a looped path; d) It may be essential to configure a publish-subscribe network link such that no permanent loop exists, but some messages can arrive more than once at the same node (FIG. 1: message propagates to node A and C, once link 100 is deleted and link 200 is created, message propagates from node B to C) or a node is temporarily isolated (FIG. 1: as link 100 is deleted, node B is temporarily isolated until link 200 is created).

A number of techniques and technologies have been used for detecting whether or not adding a link will create a looped path, such as: a) Static analysis of the topology of the entire publish-subscribe network at the time a new link is being added which is a manual process and requires complex logic to identify and check the different paths that will be taken by messages with all possible different topics and cannot reliably identify and prevent the kind of "bogus loop" illustrated in FIG. 1; b) Transmit specialized or "probe" messages at the time a new link is being added. These messages are not delivered to normal users and require complex logic to construct and route so that they traverse all possible paths.

SUMMARY OF THE INVENTION

One of the embodiments of this invention is to detect and correct looping problems in a publish-subscribe messaging network. This invention requires a token which uniquely identifies a node in this network or universally unique to this messaging network. This system maintains a list of Universally Unique Identifiers (UUID) as a metadata attached to each publish-subscribe message ("publication"). As a node forwards a publication to another node, it is required to append its own UUID to this list.

When a node receives a publication from another node, it is required to check the list of UUID's attached to the received message. If its own UUID is already in the list the node is obligated to discard the publication as a loop is detected. The node can emit diagnostic message with the UUID list once a loop is detected so that automatic or manual corrective action could be taken. If its own UUID is not in the list of UUID's attached to the message, it is obligated to add its own UUID to the list and send the message to the next node.

Several nodes could also form a broker cooperative aggregate node if this broker aggregate node has internal mechanism for preventing publications looping within the broker cooperative aggregated node and could use only one unique identifier for these nodes. A message received by this broker cooperative aggregate node is discarded only if it is received from a node outside of this broker cooperative aggregate node and unique identifier for this broker cooperative aggregate node is found in UUID list.

DETAILED DESCRIPTION OF THE PREFERRED EMBODIMENTS

One of the embodiments is a technique for detecting and correcting publish-subscribe looping in a messaging network. This invention requires a token which uniquely identifies a node in a messaging network such as publish-subscribe networks. "Uniquely identifies" means that no two nodes in the same network have the same token or identification (ID). This could be Universally Unique Identifier (UUID) as proposed by International Communications Union (ITU) ITU-T Rec. X.667 or standardized by Open Software Foundation (OSF) as a part of Distribution Computing Environment (DCE) which is implemented by many messaging systems or any identifier which is unique to the messaging network's universe.

Figure 1:
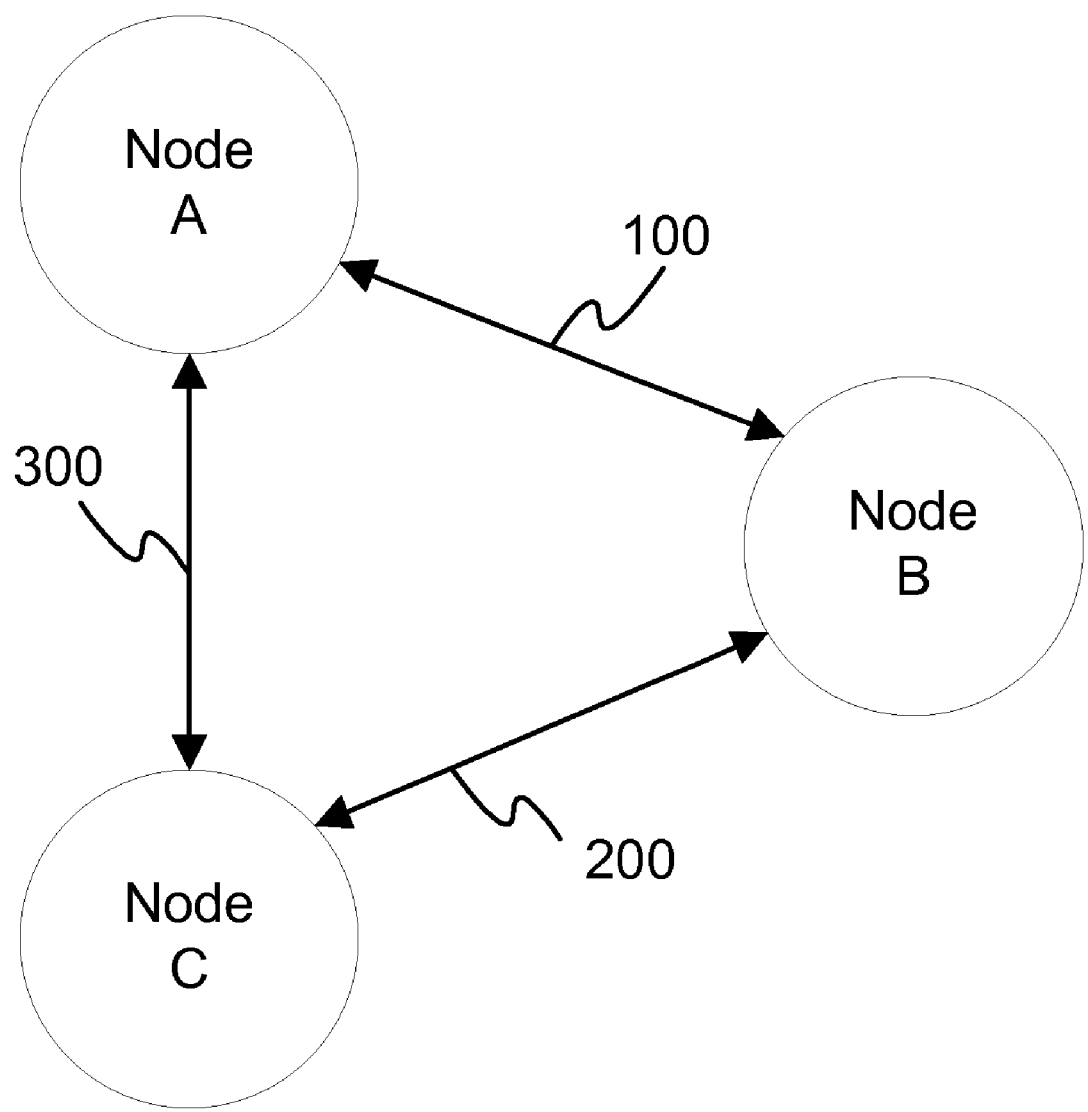
FIG. 1 describes the unavoidable loop problems when configuring links in a multi-node messaging network.
Figure 2:
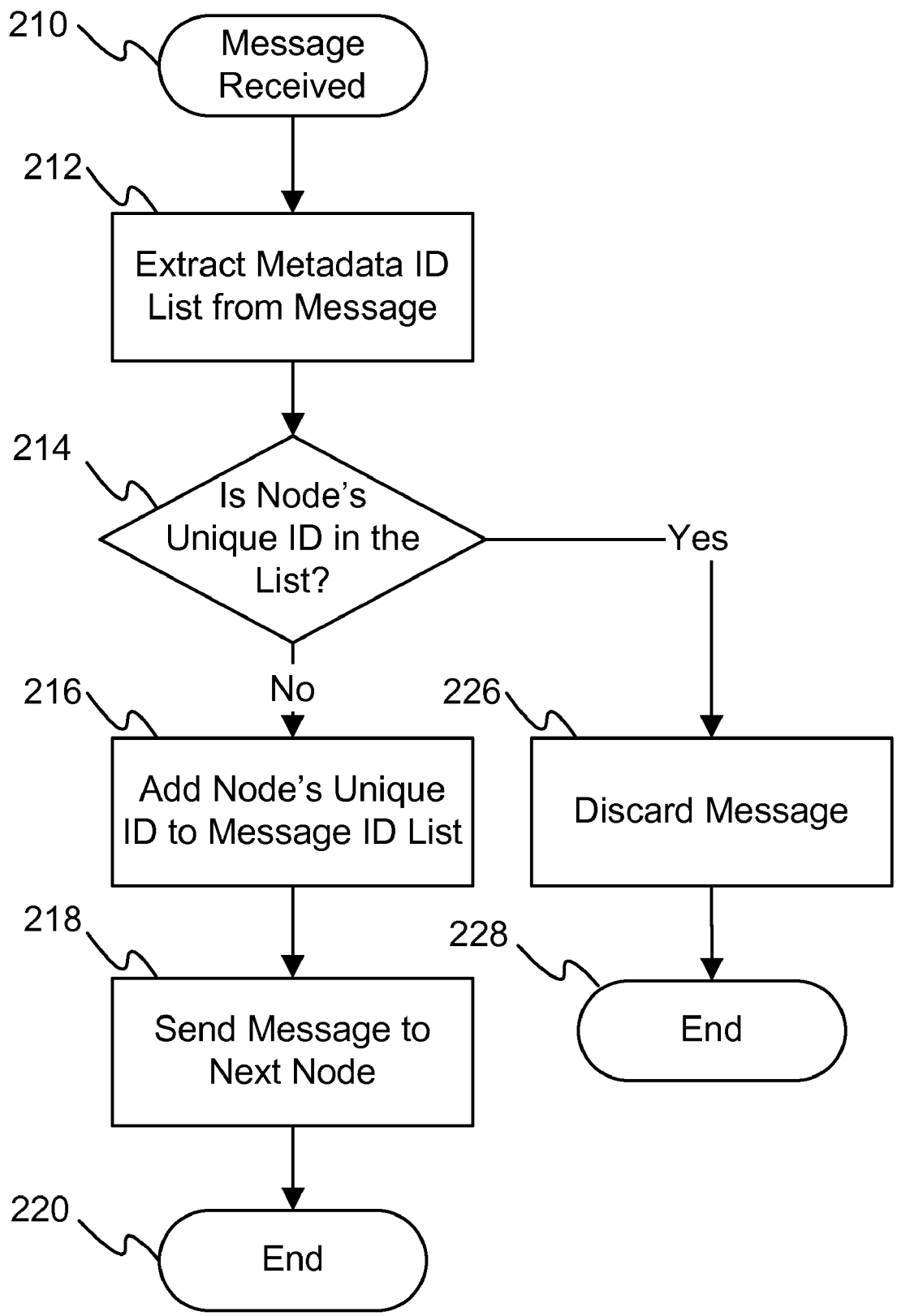
FIG. 2 is the step by step description of detecting and correcting publish-subscribe looping in a messaging network.

This messaging network comprises a plurality of nodes and further comprises a plurality of communication paths located between each of the nodes (100, 200, 300). The steps for loop detection and correction are depicted in FIG. 2 and are comprised of the following: as first message is send through the messaging network from a first node to a second node, message is received by second node in step 210.

The second node's system extracts the list of ID codes from the metadata attached to the received first message in step 212. The ID code uniquely identifies a specific node and the ID code list extracted from the messages provides information about all participating nodes that the first message has gone through.

A participating node is a node that interacts with the list of identification codes, and whose identification code format is according to the list of identification codes.

The second node's system determines whether or not its unique identification code is in the list of identification codes extracted from the message in step 214.

In the case that identification code corresponding to the second node is in the list of identification codes extracted from the message, the second node discards the first message in step 226 and system terminates in step 228;

In the case that the identification code corresponding to the second node is not in the list of identification codes extracted from message, the second node adds the unique identification code corresponding to the second node to the list of identification codes and updated ID list is attached to the message in step 216, second node transmits the first message to next node in the messaging network in step 218 and second node terminates the message processing in step 220.

Another embodiment of this invention is when two or more of the plurality of nodes is aggregated into a broker cooperative aggregated node and this broker cooperative aggregated node has an internal mechanism for preventing publications looping within the broker cooperative aggregated node and the broker cooperative aggregated node has a unique identification code. If a third node within the broker cooperative aggregated node receives a message from a fourth node, the third node discards the second message, only if the fourth node is not within the broker cooperative aggregated node, and the unique identification code of the third node is in the list of identification codes attached to the second message.

The third node sends the second message to another node or nodes and the third node adding the unique identification code of the broker cooperative aggregated node to the list of identification codes attached to the second message only if the node that this message is intended for is not within the broker cooperative aggregated node.

Another embodiment of this invention is for the node to send a diagnostics message when a loop was detected so that an automatic or manual corrective action could be taken. As a part of the diagnostic message the list of unique node ID's which the message has traveled though can be included.

Another embodiment of this invention is control of the amount and frequency of the diagnostics messages. Control of the diagnostics message could be accomplished by setting enable and disable mechanism to permanently disable the loop detection diagnostics messages. Frequency of the diagnostics message could be accomplish by creating a delay mechanism which could be set to temporarily disable these messages from the last diagnostic message after which the diagnostics messages are enabled again.

A system (or device or apparatus) that comprises any of messaging network, nodes, switches, routers, fiber optics, servers, clients, PCs, mobile devices, subscribers, publishers, and loops, and applies the method of publish-and-subscribe above, is one example for the application of this invention.

Any variations of the above teaching are also intended to be covered by this patent application.

The invention claimed is:

1. A method for detecting and correcting publish-subscribe looping in a messaging network,
   wherein said messaging network comprises a plurality of nodes;
   wherein said messaging network further comprises a plurality of communication paths located between said plurality of nodes;
   said method comprising the steps of:
   sending a first message through said messaging network, from a first node to a second node;
   said second node extracting a list of identification codes attached to said first message;
   wherein an identification code uniquely defines a specific node;
   wherein said list of identification codes provides information about all participating nodes that said first message has gone through;
   wherein a participating node is a node that interacts with said list of identification codes, and whose identification code format is according to said list of identification codes;
   said second node determining whether or not the identification code corresponding to said second node is in said list of identification codes;
   in the case that said identification code corresponding to said second node is in said list of identification codes, said second node discarding said first message;
   in the case that said identification code corresponding to said second node is not in said list of identification codes, said second node adding said identification code corresponding to said second node to said list of identification codes, and said second node transmitting said first message to next one or more nodes in said messaging network;
   wherein two or more of said plurality of nodes are aggregated into a broker cooperative aggregated node;
   wherein said broker cooperative aggregated node has an internal mechanism for preventing publications looping within said broker cooperative aggregated node;
   wherein said broker cooperative aggregated node has a unique identification code;
   a third node within said broker cooperative aggregated node receiving a second message from a fourth node;
   said third node discarding said second message, only if said fourth node is not within said broker cooperative aggregated node, and the identification code of said third node is in a list of identification codes attached to said second message;
   said third node sending said second message to a fifth node; and
   said third node adding said identification code of said broker cooperative aggregated node to said list of identification codes attached to said second message, only if said fifth node is not within said broker cooperative aggregated node.

* * * * *